Patented Sept. 6, 1938

2,129,136

UNITED STATES PATENT OFFICE 2,129,136

SOLID DIAZONIUM SALT

Ferdinand Keller and Wilhelm Koch, Offenbach-on-the-Main, Germany, assignors to General Aniline Works, Inc., New York, N. Y., a corporation of Delaware No Drawing. Application March 10, 1937, Serial No. 130,219. In Germany March 10, 1936

6 Claims. (Cl. 260—141)

The present invention relates to new solid diazonium salts; more particularly it relates to diazonium salts corresponding to the general formula:

aryl—O—aryl—N=N—OSO$_3$alkyl

We have found that diazonium alkyl-sulfates of amino-diaryl-ethers are obtainable in the solid form from solutions of these salts or from solutions of their mineral acid diazonium compounds after addition of alkyl sulfuric acid or a salt thereof, by separating either directly or after neutralizing the excess of mineral acid by cooling or salting out or by both operations.

These hitherto unknown solid diazonium salts are of good durability and have good solubility. The diazo salts obtainable by the process yield neutral diazo solutions, which is of particular importance in the application of such solutions in the practice of dyeing. The products differ, therefore, from the acid sulfates, the production of which in solid form is already known in as much as these require in practice the use of neutralizing agents.

The diazonium alkyl-sulfates of the amino-diaryl-ethers may be converted into stable diazo salts when mixed with the usual diluents or adjuvants.

The following examples serve to illustrate the invention, but they are not intended to limit it thereto; the parts are by weight:

(1) 100 parts of 1-amino-2-(4'-chloro-phenoxy)-5-chlorobenzene are melted and gradually dropped at 40–45° C. into 719 parts of hydrochloric acid of 10 per cent. strength. The mixture is stirred for one hour at 40–45° C. and when the hydrochloride has been formed the mass is cooled to 10° C. and diazotized by running in 72 parts of sodium nitrite solution of 40 per cent. strength, and the diazo solution is filtered. Into the diazo solution are then introduced 254 parts of ammonium sulfate, and thereupon 152.5 parts of a solution of sodium methyl-sulfate of 41.5 per cent. strength is run in gradually. The diazonium methyl-sulfate separates. After drying at a low temperature it is a nearly white crystalline power, an aqueous solution of which is neutral to Congo. The diazonium salt is characterized by the following formula:

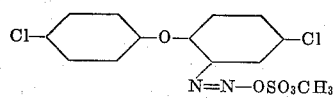

If there is used, instead of the sodium methyl-sulfate, another alkyl-sulfate, for instance; sodium n-butyl-sulfate or sodium iso-butyl-sulfate, the corresponding solid diazonium salts are obtained with a very good yield.

In like manner the diazonium alkyl-sulfates from 1-amino-2-phenoxy-4,5-dichlorobenzene may be made.

(2) 100 parts of 1-amino-2-(4'-chloro-phenoxy)-5-chlorobenzene are diazotized as described in Example 1. The diazo solution is mixed with 254 parts of ammonium sulfate and 153.5 parts of a solution of 45.6 per cent. strength of sodium ethyl-sulfate. The diazonium ethyl-sulfate separates in the form of beautiful yellow crystals which are filtered and finished in the usual manner.

(3) 100 parts of 1-amino-2-phenoxy-5-chlorobenzene are introduced in portions at 25–30° C. into 151.9 parts of nitrosyl-sulfuric acid of 40 per cent. strength. When the introduction is completed, the mixture is stirred at the temperature named until a sample of it dissolves clearly in water. The diazo solution is then poured into 500 parts of water and 200 parts of ice. Thereafter the diazo solution is filtered. The filtrate is mixed with 154.6 parts of a solution of 41.5 per cent. strength of the sodium methyl-sulfate and the precipitation, which soon begins, is completed by the addition of 80 parts of Glauber's salt. The diazonium methyl-sulfate is dried at a low temperature and it is then a yellowish-white powder.

In like manner a solid diazonium methyl-sulfate is made from 1-amino-2-(4'-methyl-phenoxy)-5-chlorobenzene.

If sodium ethyl-sulfate is used, the corresponding diazonium ethyl-sulfates are obtained.

(4) 100 parts of a finely powdered 1-amino-2-(naphthyl-(2')-hydroxy)-4-chlorobenzene are introduced into 271 parts of hydrochloric acid of 20 per cent. strength at 40° C. and the mixture is stirred at the same temperature for about an hour until the formation of hydrochloride is complete. It is then cooled to 0–5° C. and diazotized by adding by drops 67.2 parts of sodium-nitrite solution of 40 per cent. strength. The filtered diazo solution is now mixed with 95 parts of sulfuric acid of 60° Bé. and then there are added 125.8 parts of a solution of 41.5 per cent. strength of sodium methyl-sulfate. By salting out with 120 parts of ammonium sulfate the diazonium methyl-sulfate is precipitated and may be finished as usual.

In like manner may be made a solid diazonium ethyl-sulfate from 1-amino-2-phenoxy-4-chlorobenzene by the use of sodium ethyl-sulfate.

(5) 100 parts of 1-amino-2-(4'-chloro-phenoxy)-5-chlorobenzene are finely ground and at about 20° C. introduced into 450 parts of ethyl-sulfuric acid of 33.6 per cent. purity. After stirring for one hour 72 parts of sodium-nitrite solution of 40 per cent. strength are allowed to flow rapidly under the surface of the liquid at 15–20° C. When diazotization is complete, the whole is diluted with 1000 parts of water and filtered. Into this diazo solution 450 parts of ammonium sulfate are introduced and the mass is cooled to 0–5° C., whereby the diazonium ethyl-sulfate separates in the form of crystals and may be worked up in the usual manner.

(6) 100 parts of 1-amino-2-(2'-chloro-phenoxy)-benzene are introduced at 25–30° C. into 151.9 parts of nitrosyl-sulfuric acid of 40 per cent. strength. The mixture is warmed to 35–40° C. and stirred until a sample dissolves clearly in water. The diazo solution is run into 340 parts of water and 100 parts of ice, the solution is mixed with 50 parts of Glauber's salt and filtered. To this diazo solution there are added 154.6 parts of a solution of 41.5 per cent. strength of sodium methyl-sulfate; no precipitate is at first formed. However, on the addition of 60 parts of ammonium sulfate the diazonium methyl-sulfate separates. It is worked up as usual.

By substituting sodium ethyl-sulfate for the methyl-salt, the corresponding diazonium ethyl-sulfate may be made.

In the same manner the diazonium alkyl-sulfates may be obtained from 1-amino-2-(2'-chlorophenoxy)-5-chlorobenzene.

(7) 100 parts of 1-amino-2-(2',5'-dichlorophenoxy)-5-methylbenzene are introduced at 40° C. into 165.9 parts of nitrosyl-sulfuric acid of 30 per cent. strength, and the mixture is stirred at 40° C. until a sample dissolves clearly in water. The diazo solution is run into 400 parts of water and 180 parts of ice and the solution is filtered. To the filtrate are added 126.5 parts of a solution of 41.5 per cent. strength of sodium methyl-sulfate or 127.2 parts of a solution of 45.6 per cent. strength of sodium ethyl-sulfate and 80 parts of Glauber's salt. The separated diazonium alkyl-sulfates are filtered and dried at a low temperature.

(8) 100 parts of 1-amino-2-phenoxy-4-acetyl-amino-5-chlorobenzene are introduced at 30° C. into 264 parts of hydrochloric acid of 20 per cent. strength and the whole is stirred for about an hour at 30° C. until the formation of hydrochloride is complete. The mass is then cooled to 0–5° C. and diazotized by running in 65.5 parts of sodium-nitrite solution of 40 per cent. strength. The filtered diazo solution is mixed with 91 parts of sulfuric acid of 60° Bé. and then there are added 122.9 parts of a solution of 41.5 per cent. strength of sodium methyl-sulfate. By salting out with 55 parts of Glauber's salt there is produced a crystalline precipitate of the diazonium methyl-sulfate, which is separated as usual.

The diazonium ethyl-sulfate is made in the same manner by using a salt of ethyl-sulfuric acid.

(9) 100 parts of 1-amino-4-(4'-chloro-phenoxy)-benzene are introduced into 333 parts of hydrochloric acid of 20 per cent. strength at 40° C. and stirred for one hour until the formation of the hydrochloride is finished. The mass is cooled to 0–5° C. and diazotized by running in 84.6 parts of sodium-nitrite solution of 40 per cent. strength. The diazo solution is filtered and to the filtrate there are added 154.6 parts of a solution of sodium methyl-sulfate of 41.5 per cent. strength. By salting out with 60 parts of Glauber's salt a white crystalline precipitate is produced which after filtration is dried at a low temperature.

In corresponding manner a solid diazonium alkyl-sulfate of 1-amino-4-phenoxy-3-chlorobenzene is produced.

(10) 100 parts of 1-amino-4-phenoxy-benzene are introduced at about 15–20° C. into 526 parts of hydrochloric acid of 15 per cent. strength, and the mixture is diazotized by running in 96 parts of sodium-nitrite solution of 40 per cent. strength. The filtered diazo solution is mixed with a solution of 45.6 per cent. strength of 193 parts of sodium ethyl-sulfate and the diazonium ethyl-sulfate thus formed is salted out with 340 parts of ammonium sulfate. A bright oil at first separates, but after some time this becomes crystalline. After stirring for a prolonged time and cooling to 0–5° C., the crystals are filtered and finished as usual.

In a manner similar to that described in the preceding examples, solid diazonium alkyl-sulfates are obtained from the following amino-diaryl-ethers:

1-amino-2-phenoxy-3-chlorobenzene,
1-amino-2-phenoxy-5-bromobenzene,
1-amino-2-(4'-methoxy-phenoxy) - 5 - methoxybenzene,
1-amino - 2 - (4'-methoxy-phenoxy)-5- trifluoromethylbenzene,
1-amino-2-(2'-methyl - 5'-chloro-phenoxy) - 5 - chlorobenzene,
1-amino-2-phenoxy-5-nitrilobenzene,
1-amino-2-phenoxy-5-acetylbenzene,
1-amino-2-phenoxybenzene - 5 - carboxylic acid phenyl ester,
1-amino-2-phenoxy-5-benzoylbenzene,
1-amino-2-(2', 4'-dichlorophenoxy)-benzene-5- carboxylic acid anilide,
1-amino-2-phenoxybenzene - 5 - carboxylic acid diethylamide,
3-amino-4-phenoxy-diphenylsulfone,
1-amino-2-phenoxybenzene-5-sulfonyl-dimethyl-amine,
1-amino - 2 - (4'-ethoxy-carbonyl-phenoxy) - 5 - chlorobenzene,
1-amino-2-[5', 6', 7', 8'-tetrahydro - naphthyl-(2')-hydroxy]-5-chlorobenzene,
3-(2' - amino - 4' - chlorophenoxy) - diphenylene oxide,
2-(2'-amino-4'-chlorophenoxy)-carbazole,
1-amino-2-phenoxy-4-methoxy-5-chlorobenzene,
1-amino-2-phenoxy-4-nitro-5-methoxybenzene,
1-amino-2-phenoxy-4-benzoylamino - 5 - ethoxybenzene,
1-amino-2-phenoxy-4-ethyl-sulfonylbenzene,
1-amino-2-phenoxy-4-nitrobenzene,
1-amino-3-phenoxy-4,6-dichlorobenzene,
1-amino-3-phenoxy-4-chloro-6-methoxybenzene,
1-amino-3,(4'-methoxy-phenoxy) - 4 - nitrobenzene,
1-amino- 4 -(3'-methylphenoxy) - 3 - methylbenzene,
1-amino-4-phenoxybenzene-2-sulfonyl-dimethyl-amine,
1-amino-4-phenoxy-3,5-dichlorobenzene,
1-amino-4-phenoxy-2-nitrobenzene,
1-amino-4-phenoxy-3-trifluoromethylbenzene,
1-amino-4-phenoxy-2-chloro-5-methylbenzene,
1-amino-4-(2',4'-dinitro-phenoxy)-benzene,
1-amino-4-(2',4',5'-trichlorophenoxy)-3-chlorobenzene,
1-amino-2,4-diphenoxy-5-chlorobenzene,
1-amino-2,4-di-(4'-chlorophenoxy)-5 - methoxybenzene,
1-amino-4-(4'-chlorophenoxy)-naphthalene,
1-amino-4-phenoxy-3-chloronaphthalene.

We claim:
1. The solid diazonium salts of the following general formula:

RO—R₁—N=N—OSO₃R₂ wherein R stands for a member of the group consisting of radicals of the benzene, naphthalene, tetrahydronaphthalene, diphenyleneoxide and carbazole series, $R_1$ for a member of the group consisting of radicals of the benzene and naphthalene series, and $R_2$ means a lower alkyl group, being very stable and easily soluble in water.

2. The solid diazonium salts of the following general formula:

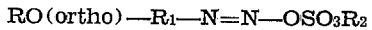

wherein R stands for a member of the group consisting of radicals of the benzene, naphthalene, tetrahydronaphthalene, diphenyleneoxide and carbazole series, $R_1$ for a member of the group consisting of radicals of the benzene and naphthalene series, and $R_2$ means a lower alkyl group, being very stable and easily soluble in water.

3. The solid diazonium salts of the following general formula:

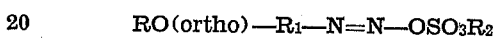

wherein R and $R_1$ stands for radicals of the benzene series, and $R_2$ means a lower alkyl group, being very stable and easily soluble in water.

4. The solid diazonium salt of the following formula:

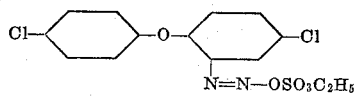

forming fine yellow crystals, being very stable and easily soluble in water.

5. The solid diazonium salt of the following formula:

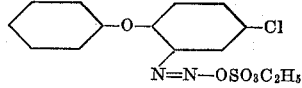

being very stable and easily soluble in water.

6. The solid diazonium salt of the following formula:

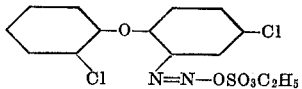

being very stable and easily soluble in water.

FERDINAND KELLER.
WILHELM KOCH.